United States Patent
Zhu et al.

(10) Patent No.: US 12,206,112 B2
(45) Date of Patent: Jan. 21, 2025

(54) ASYMMETRIC METAL COMPLEX AS AN ACTIVE MATERIAL OF A FLOW BATTERY

(71) Applicants: Yu Zhu, Copley, OH (US); Xiang Li, Akron, OH (US)

(72) Inventors: Yu Zhu, Copley, OH (US); Xiang Li, Akron, OH (US)

(73) Assignee: THE UNIVERSITY OF AKRON, Akron, OH (US)

( * ) Notice: Subject to any disclaimer, the term of this patent is extended or adjusted under 35 U.S.C. 154(b) by 393 days.

(21) Appl. No.: 17/479,438

(22) Filed: Sep. 20, 2021

(65) Prior Publication Data

US 2022/0093927 A1    Mar. 24, 2022

Related U.S. Application Data

(60) Provisional application No. 63/080,374, filed on Sep. 18, 2020.

(51) Int. Cl.
| | |
|---|---|
| *H01M 4/60* | (2006.01) |
| *C07F 15/02* | (2006.01) |
| *H01M 4/36* | (2006.01) |
| *H01M 8/18* | (2006.01) |

(52) U.S. Cl.
CPC .............. *H01M 4/60* (2013.01); *C07F 15/02* (2013.01); *H01M 4/368* (2013.01); *H01M 8/188* (2013.01)

(58) Field of Classification Search
None
See application file for complete search history.

(56) References Cited

PUBLICATIONS

Chemical Abstract Registry No. 819059-83-1, indexed in the Registry File on STN CAS Online Jan. 24, 2005.*
Chemical Abstract Registry No. 770701-52-5, indexed in the Registry File on STN CAS Online Oct. 28, 2004.*
Chemical Abstract Registry No. 425372-54-9, indexed in the Registry File on STN CAS Online Jun. 4, 2002.*
Chemical Abstract Registry No. 1446742-27-3, indexed in the Registry File on STN CAS Online Jul. 31, 2013.*

* cited by examiner

*Primary Examiner* — Po-Chih Chen
(74) *Attorney, Agent, or Firm* — RENNER KENNER GREIVE BOBAK TAYLOR & WEBER

(57) ABSTRACT

The present invention teaches an asymmetrical metal complex comprising a metal center coordinated with between two and six hydrophilic ligands, wherein at least one of said hydrophilic ligands is chemically different than the other said hydrophilic ligands.

6 Claims, No Drawings

ASYMMETRIC METAL COMPLEX AS AN ACTIVE MATERIAL OF A FLOW BATTERY

FIELD OF THE INVENTION

The present invention generally relates to metal complexes as an active material of a flow battery. Particularly, the present invention relates to asymmetrical metal complexes as an active material of a flow battery. More particularly, the present invention relates to asymmetrical metal complexes coordinated with between two and six hydrophilic ligands, wherein at least one of said hydrophilic ligands being chemically different than the other said hydrophilic ligands.

BACKGROUND OF THE INVENTION

Based on their synthetic tunability, natural abundance, and inherent safety, the recent introduction of aqueous organic species provides a viable way to overcome the limitations of traditional transition metal ions as active materials for redox flow batteries (RFB), which can be used for large-scale energy storage. So far, pure organic compounds such as quinone-based molecules, viologen derivatives, alloxazine-based molecules, phenazine derivatives, (2,2,6,6-tetramethyl-1-piperidinyloxy) also known as TEMPO, and electrochemically active polymers have been reported as aqueous soluble organic (ASO) active materials. Studies on the use of metal-organic complexes in RFBs, however, are much scarcer. The ASO materials are sustainable, and their redox potential can be tuned by adjusting their molecular structure. In addition, because of the size of the organic building blocks, many ASO compounds have significantly lower crossover rates when compared to small inorganic ions.

The development of ASO materials also faces great challenges. Although the solubility of the active materials needs to be improved to achieve higher energy densities, a more critical issue is a lack of high-performance catholyte materials. One of major reasons why this is an issue is that the aromatic ASO materials are inherently unstable as high voltage catholytes because of the Michael addition side reaction that occurs under aqueous conditions. Even though TEMPO, the most widely used organic catholyte, contains no aromatic structure, the disproportionation reaction of the TEMPO radical has still been observed.

Recent research on the design and development of high-performance catholytes based on metal complex compounds has been rare, and the results have typically been reported as unsuccessful. Among others, ferrocyanide has become the de facto choice of catholyte materials because it has reasonably good solubility and electrochemical stability. In addition to its instability under basic solution conditions and the severe crossover issue, the low redox potential (0.4~0.6 V vs. SHE, pH=7) presents a significant limitation on the overall cell voltage and energy density that can be achieved.

Therefore, there is a need in the art for a hybrid material with a metal redox center and organic building blocks to modulate electrochemical properties of the hybrid material that has better solubility and an increase in potential when compared to ferrocyanide.

SUMMARY OF THE INVENTION

An embodiment of the present invention provides an asymmetrical metal complex comprising a metal center coordinated with between two and six hydrophilic ligands, wherein at least one of said hydrophilic ligands being chemically different than the other said hydrophilic ligands.

Another embodiment of the present invention provides an asymmetrical metal complex as in any embodiment above, wherein the metal center is selected from iron, cobalt, titanium, vanadium, chromium, manganese, nickel, copper, aluminum, and zinc.

Another embodiment of the present invention provides an asymmetrical metal complex as in any embodiment above, wherein the hydrophilic ligands are selected from pyridine; pyridines substituted with a hydrophilic functional group having the following formula:

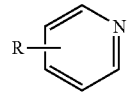

(Formula I)

wherein R within the confines of Formula I is a hydrophilic functional group selected from carboxylic acid groups, hydroxyl groups, amino groups, phosphate groups, sulfhydryl groups, ether groups, or sulfonate groups; bipyridine; bipyridines substituted with a hydrophilic functional group having the following formula:

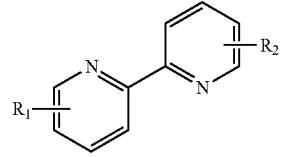

(Formula II)

wherein $R_1$ within the confines of Formula II is hydrogen or a hydrophilic functional group selected from carboxylic acid groups, hydroxyl groups, amino groups, phosphate groups, sulfhydryl groups, ether groups, or sulfonate groups and wherein $R_2$ within the confines of Formula II is hydrogen or a hydrophilic functional group selected from carboxylic acid groups, hydroxyl groups, amino groups, phosphate groups, sulfhydryl groups, ether groups, or sulfonate groups; terpyridine; terpyridines substituted with a hydrophilic functional group having the following formula:

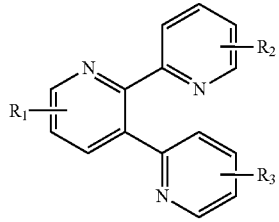

(Formula III)

wherein $R_1$ within the confines of Formula III is hydrogen or a hydrophilic functional group selected from carboxylic acid groups, hydroxyl groups, amino groups, phosphate groups, sulfhydryl groups, ether groups, or sulfonate groups, wherein $R_2$ within the confines of Formula III is hydrogen or a hydrophilic functional group selected from carboxylic acid groups, hydroxyl groups, amino groups, phosphate groups, sulfhydryl groups, ether groups, or sulfonate groups, and wherein $R_3$ within the confines of Formula III is hydrogen or a hydrophilic functional group selected from carboxylic acid groups, hydroxyl groups, amino groups, phosphate groups, sulfhydryl groups, ether groups, or sulfonate groups; 1,10-phenanthroline; 1,10-phenanthrolines substituted with a hydrophilic functional group having the following formula:

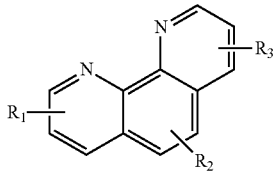

(Formula IV)

wherein $R_1$ within the confines of Formula IV is hydrogen or a hydrophilic functional group selected from carboxylic acid groups, hydroxyl groups, amino groups, phosphate groups, sulfhydryl groups, ether groups, or sulfonate groups, wherein $R_2$ within the confines of Formula IV is hydrogen or a hydrophilic functional group selected from carboxylic acid groups, hydroxyl groups, amino groups, phosphate groups, sulfhydryl groups, ether groups, or sulfonate groups, and wherein $R_3$ within the confines of Formula IV is hydrogen or a hydrophilic functional group selected from carboxylic acid groups, hydroxyl groups, amino groups, phosphate groups, sulfhydryl groups, ether groups, or sulfonate groups; triphenylphosphine; triphenylphosphines substituted with a hydrophilic functional group having the following formula:

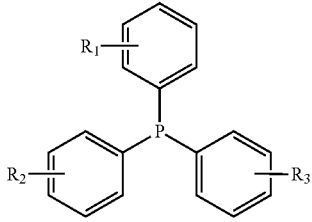

(Formula V)

wherein $R_1$ within the confines of Formula V is hydrogen or a hydrophilic functional group selected from carboxylic acid groups, hydroxyl groups, amino groups, phosphate groups, sulfhydryl groups, ether groups, or sulfonate groups, wherein $R_2$ within the confines of Formula V is hydrogen or a hydrophilic functional group selected from carboxylic acid groups, hydroxyl groups, amino groups, phosphate groups, sulfhydryl groups, ether groups, or sulfonate groups, and wherein $R_3$ within the confines of Formula V is hydrogen or a hydrophilic functional group selected from carboxylic acid groups, hydroxyl groups, amino groups, phosphate groups, sulfhydryl groups, ether groups, or sulfonate groups; trialkylphosphine; trialkylphosphines substituted with a hydrophilic functional group having the following formula:

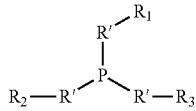

(Formula VI)

wherein R' is any alkyl group and wherein $R_1$ within the confines of Formula VI is hydrogen or a hydrophilic functional group selected from carboxylic acid groups, hydroxyl groups, amino groups, phosphate groups, sulfhydryl groups, ether groups, or sulfonate groups, wherein $R_2$ within the confines of Formula VI is hydrogen or a hydrophilic functional group selected from carboxylic acid groups, hydroxyl groups, amino groups, phosphate groups, sulfhydryl groups, ether groups, or sulfonate groups, and wherein $R_3$ within the confines of Formula VI is hydrogen or a hydrophilic functional group selected from carboxylic acid groups, hydroxyl groups, amino groups, phosphate groups, sulfhydryl groups, ether groups, or sulfonate groups; pyrazine; pyrazines substituted with a hydrophilic functional group having the following formula:

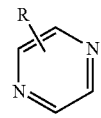

(Formula VII)

wherein R within the confines of Formula VII is a hydrophilic functional group selected from carboxylic acid groups, hydroxyl groups, amino groups, phosphate groups, sulfhydryl groups, ether groups, or sulfonate groups; cyclopentadienyl; cyclopentadienyls substituted with a hydrophilic functional group having the following formula:

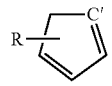

(Formula VIII)

wherein R within the confines of Formula VII is a hydrophilic functional group selected from carboxylic acid groups, hydroxyl groups, amino groups, phosphate groups, sulfhydryl groups, ether groups, or sulfonate groups; ethylenediaminetetraacetic acid; glycinate; ethylene glycol-bis(β-aminoethyl ether)-N,N,N',N'-tetraacetic acid; nitrilotriacetic acid; cyanide; thiocyanate; carbon monoxide; hydroxide; oxalate; isothiocyanate; ethylenediamine; aminopolycarboxylic acid; 1,4,7,10-tetraazacyclododecane-1,4,7,10-tetraacetic acid; dimethylglyoximate; triethylenetetramine; tris (2-aminoethyl)amine; acetylacetone; 1,2-bis (diphenylphosphino)ethane; 1,1-bis(diphenylphosphino) methane; and corroles.

Another embodiment of the present invention provides an asymmetrical metal complex as in any embodiment above, wherein the metal center is coordinated to two different hydrophilic ligands Another embodiment of the present invention provides an asymmetrical metal complex as in any embodiment above, a first ligand of the two different hydrophilic ligands coordinated to the metal center of the metal complex is 2,2'-bipyridine-4,4'-dicarboxylic acid ($H_2$Dcbpy), and the second ligand of the two different hydrophilic ligands coordinated to the metal center of the metal complex is cyanide.

Another embodiment of the present invention provides an asymmetrical metal complex as in any embodiment above, further comprising a cation selected from sodium, potassium, lithium, magnesium, calcium, pyridinium, imidazolium, ammonium, and any cation with the formula $N(R)_4$ where R is any alkyl.

Another embodiment of the present invention provides an asymmetrical metal complex as in any embodiment above, further comprising an anion selected from sulfate, carbonate, nitrate, perchlorate, chlorine, bromine, iodine, sulfur, oxalate, cyanide, bicarbonate, hydrogen sulfate, acetyl, and hydroxide.

Another embodiment of the present invention provides an asymmetrical metal complex as in any embodiment above, wherein the solubility of the complex in water is larger than 0.5 M at a temperature of greater than 20° C.

An embodiment of the present invention provides a redox flow battery, wherein the metal complex of claim 1 is used as a catholyte.

An embodiment of the present invention provides a redox flow battery, wherein the metal complex of claim 1 is used as an anolyte.

DETAILED DESCRIPTION OF ILLUSTRATIVE EMBODIMENTS

The present invention provides a metal complex with significantly improved solubility and tunable redox potential. The metal complex includes a metal center coordinated with between two and six hydrophilic ligands, wherein at least one of said hydrophilic ligands being chemically different than the other said hydrophilic ligands. The synthetic structure of the metal redox center and the hydrophilic ligands are shown to improve not only the solubility but also the long-term cycling performance in an aqueous soluble organic (ASO) flow battery with the mitigation of crossover.

As the energy density of a flow battery is determined by the cell voltage and electrolyte concentration, those two factors are the primary targets when designing a metal complex. In addition, other factors such as crossover and electrochemical stability are considered. To avoid an oxygen evolution reaction (OER), higher redox potential is preferred for the metal complex to achieve higher cell voltage when utilized in a battery. The influence of ligands on electrochemical potentials of metal complexes is known. The electrochemical potential can be tuned through the metal center of the complex preferring soft vs. hard ligands, along with the electron donating/accepting features of ligands. In general, stabilization of reduction or oxidation states of the metal complex will shift its redox potential positively or negatively. Additionally, it has been widely accepted that the electrochemical potential of a metal complex results from the cumulative contributions of all things coordinated to the metal centers.

In some embodiments of the present invention, a water-soluble bipyridine ligand is selected for the design of novel complex molecules for aqueous organic redox flow batteries (AORFB). Bipyridine ligands will increase the electrochemical potential; therefore, ions with relatively low oxidative potential compared to the OER voltage (such as $Fe^i$) could be selected to provide design space. Additionally, bipyridine ligands are bulky and would therefore also enlarge the size of the complex, thus mitigating the crossover of active materials. The selection of a bipyridine ligand and an iron metal center would also be desirable from a cost perspective.

It has previously been shown that molecular symmetry within a metal complex contributes to the entropy of melting more than proportionally. Therefore, by breaking the symmetry of a metal complex, the solubility of said metal complex is dramatically enhanced. A metal complex coordinated with a bipyridine ligand, such as 2,2'-bipyridine-4,4'-dicarboxylic acid ($H_2Dcbpy$) is highly symmetric. To reduce the symmetry, the present invention introduces between two and six hydrophilic ligands, wherein at least one of said hydrophilic ligands is chemically different than the other hydrophilic ligands. The use of between two and six hydrophilic ligands, wherein at least one of said hydrophilic ligands is chemically different than the other hydrophilic ligands in the complex, has additional advantages in modulating the electrochemical properties of the materials and allowing for fine-tuning of the electrochemical potential. Within the context of the present invention, a symmetrical metal complex is a metal complex wherein everything coordinated to the metal center of the complex is the same. Therefore, within the context of the present invention, an asymmetrical metal complex is a metal complex wherein everything coordinated to the metal center of the complex is not the same.

In one or more embodiments of the present invention, the metal utilized for the center of the metal complex is selected from iron, cobalt, titanium, vanadium, chromium, manganese, nickel, copper, aluminum, and zinc.

In one or more embodiments of the present invention, the hydrophilic ligands are selected from pyridine; pyridines substituted with a hydrophilic functional group having the following formula:

(Formula I)

wherein R within the confines of Formula I is a hydrophilic functional group selected from carboxylic acid groups, hydroxyl groups, amino groups, phosphate groups, sulfhydryl groups, ether groups, or sulfonate groups; bipyridine; bipyridines substituted with a hydrophilic functional group having the following formula:

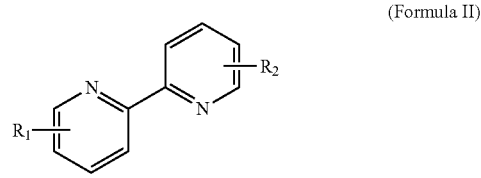

(Formula II)

wherein $R_1$ within the confines of Formula II is hydrogen or a hydrophilic functional group selected from carboxylic acid groups, hydroxyl groups, amino groups, phosphate groups, sulfhydryl groups, ether groups, or sulfonate groups and wherein $R_2$ within the confines of Formula II is hydrogen or a hydrophilic functional group selected from carboxylic acid groups, hydroxyl groups, amino groups, phosphate groups, sulfhydryl groups, ether groups, or sulfonate groups; terpyridine; terpyridines substituted with a hydrophilic functional group having the following formula:

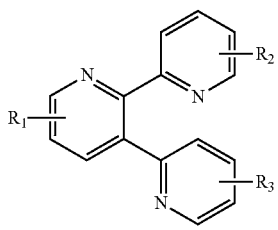

(Formula III)

wherein $R_1$ within the confines of Formula III is hydrogen or a hydrophilic functional group selected from carboxylic acid groups, hydroxyl groups, amino groups, phosphate groups, sulfhydryl groups, ether groups, or sulfonate groups, wherein $R_2$ within the confines of Formula III is hydrogen or a hydrophilic functional group selected from carboxylic acid groups, hydroxyl groups, amino groups, phosphate groups, sulfhydryl groups, ether groups, or sulfonate groups, and wherein $R_3$ within the confines of Formula III is hydrogen or a hydrophilic functional group selected from carboxylic acid groups, hydroxyl groups, amino groups, phosphate groups, sulfhydryl groups, ether groups, or sulfonate groups; 1,10-phenanthroline; 1,10-phenanthrolines substituted with a hydrophilic functional group having the following formula:

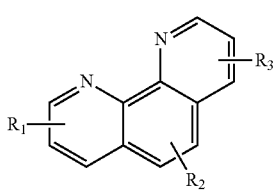

(Formula IV)

wherein $R_1$ within the confines of Formula IV is hydrogen or a hydrophilic functional group selected from carboxylic acid groups, hydroxyl groups, amino groups, phosphate groups, sulfhydryl groups, ether groups, or sulfonate groups, wherein $R_2$ within the confines of Formula IV is hydrogen or a hydrophilic functional group selected from carboxylic acid groups, hydroxyl groups, amino groups, phosphate groups, sulfhydryl groups, ether groups, or sulfonate groups, and wherein $R_3$ within the confines of Formula IV is hydrogen or a hydrophilic functional group selected from carboxylic acid groups, hydroxyl groups, amino groups, phosphate groups, sulfhydryl groups, ether groups, or sulfonate groups; triphenylphosphine; triphenylphosphines substituted with a hydrophilic functional group having the following formula:

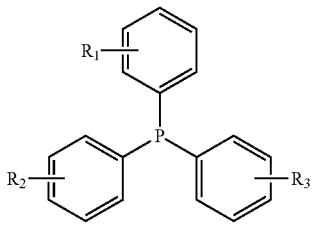

(Formula V)

wherein $R_1$ within the confines of Formula V is hydrogen or a hydrophilic functional group selected from carboxylic acid groups, hydroxyl groups, amino groups, phosphate groups, sulfhydryl groups, ether groups, or sulfonate groups, wherein $R_2$ within the confines of Formula V is hydrogen or a hydrophilic functional group selected from carboxylic acid groups, hydroxyl groups, amino groups, phosphate groups, sulfhydryl groups, ether groups, or sulfonate groups, and wherein $R_3$ within the confines of Formula V is hydrogen or a hydrophilic functional group selected from carboxylic acid groups, hydroxyl groups, amino groups, phosphate groups, sulfhydryl groups, ether groups, or sulfonate groups; trialkylphosphine; trialkylphosphines substituted with a hydrophilic functional group having the following formula:

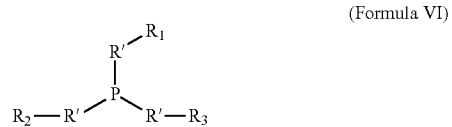

(Formula VI)

wherein R' is any alkyl group and wherein $R_1$ within the confines of Formula VI is hydrogen or a hydrophilic functional group selected from carboxylic acid groups, hydroxyl groups, amino groups, phosphate groups, sulfhydryl groups, ether groups, or sulfonate groups, wherein $R_2$ within the confines of Formula VI is hydrogen or a hydrophilic functional group selected from carboxylic acid groups, hydroxyl groups, amino groups, phosphate groups, sulfhydryl groups, ether groups, or sulfonate groups, and wherein $R_3$ within the confines of Formula VI is hydrogen or a hydrophilic functional group selected from carboxylic acid groups, hydroxyl groups, amino groups, phosphate groups, sulfhydryl groups, ether groups, or sulfonate groups; pyrazine; pyrazines substituted with a hydrophilic functional group having the following formula:

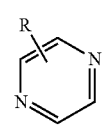

(Formula VII)

wherein R within the confines of Formula VII is a hydrophilic functional group selected from carboxylic acid groups, hydroxyl groups, amino groups, phosphate groups, sulfhydryl groups, ether groups, or sulfonate groups; cyclopentadienyl; cyclopentadienyls substituted with a hydrophilic functional group having the following formula:

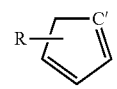

(Formula VIII)

wherein R within the confines of Formula VII is a hydrophilic functional group selected from carboxylic acid groups, hydroxyl groups, amino groups, phosphate groups, sulfhydryl groups, ether groups, or sulfonate groups; ethylenediaminetetraacetic acid; glycinate; ethylene glycol-bis(β-aminoethyl ether)-N,N,N',N'-tetraacetic acid; nitrilotriacetic acid; cyanide; thiocyanate; carbon monoxide; hydroxide; oxalate; isothiocyanate; ethylenediamine; aminopolycarboxylic acid; 1,4,7,10-tetraazacyclododecane-1,4,7,10-tetraacetic acid; dimethylglyoximate; triethylenetetramine; tris (2-aminoethyl)amine; acetylacetone; 1,2-bis(diphenylphosphino)ethane; 1,1-bis(diphenylphosphino)methane; and corroles.

By chemically different, the present invention means that the at least one of said hydrophilic ligands that is chemically different is either a completely different ligand, such as, or if it is the same ligand, then it must have different functional groups.

In one or more embodiments, the metal complex is coordinated with two different hydrophilic ligands wherein the first ligand coordinated to the metal center of the metal complex is 2,2'-bipyridine-4, 4'-dicarboxylic acid ($H_2$Dcbpy), and the second ligand coordinated to the metal center of the metal complex is cyanide.

In one or more embodiments of the present invention, the metal complex additionally includes a cation selected from sodium, potassium, lithium, magnesium, calcium, pyridinium, imidazolium, and ammonium. In other embodiments, the cation can be represented by the formula $N(R)_4$, where R is any alkyl.

In one or more embodiments of the present invention, the metal complex additionally includes an anion selected from sulfate, carbonate, nitrate, perchlorate, chlorine, bromine, iodine, sulfur, oxalate, cyanide, bicarbonate, hydrogen sulfate, acetyl, and hydroxide.

Asymmetrical metal complexes of $Na_4[Fe^{II}(Dcbpy)_2(CN)_2]$, $Na_4[Fe^{II}(Dcbpy)(CN)_4]$, $K_4[Fe^{II}(Dcbpy)_2(CN)_2]$ and $K_4[Fe^{II}(Dcbpy)(CN)_4]$ were prepared along with symmetrical metal complexes $Na_4[Fe^{II}(Dcbpy)_3]$ and $K_4[Fe^{II}(Dcbpy)_3]$ were prepared as discussed below. $^1$H NMR and $^{13}$C NMR spectra of complexes were taken to ensure the successful synthesis of all complexes.

The solubilities of symmetric complexes $Na_4[Fe^{II}(Dcbpy)_3]$ and $K_4[Fe^{II}(Dcbpy)_3]$ were 0.26 M and 0.60 M in water, respectively. For comparison, the solubility of the asymmetric complex $Na_4[Fe^{II}(Dcbpy)_2(CN)_2]$ was 1.09 M, 1.02 M for $Na_4[Fe^{II}(Dcbpy)(CN)_4]$, 1.22M for $K_4[Fe^{II}(Dcbpy)_2(CN)_2]$, and 1.12 M for $K_4[Fe^{II}(Dcbpy)(CN)_4]$. The results confirm that the asymmetric design dramatically increases the solubility. The increase of the solubility can be attributed to the asymmetric alternation of the complex geometry, which results in enhanced polarizability and stronger intermolecular interactions between the water molecules and the complexes.

$^{23}$Na NMR spectra of 0.1 M and 0.6 M $Na_4[Fe^{II}(Dcbpy)_2(CN)_2]$ and $Na_4[Fe^{II}(CN)_6]$ complexes, measured at 298 K, were referenced to aqueous NaCl solution (1 M). For the dilute concentrations of both complexes, the $^{23}$Na shift is similar to that of NaCl, indicating that the $Na^+$ solvation environment is essentially equivalent. In NaCl, this $Na^+$ solvation environment is widely believed to be a symmetric hexa-aqua structure $[Na(H_2O)_6]^+$, with Na—O bonding as the building block. For both $Na_4[Fe^{II}(Dcbpy)_2(CN)_2]$ and $Na_4[Fe^{II}(CN)_6]$, at increased concentration the observed chemical shift moves to higher frequency, with the corresponding de-shielding effect indicating both that this symmetric hexa-aqua-$Na^+$ solvation structure is disrupted, and that the resulting environment is more polarized and likely associates with the complex. Notably, however, for the more concentrated $Na_4[Fe^{II}(Dcbpy)_2(CN)_2]$ solution, this shift difference from the dilute solution is about 2.5 times that exhibited by the more concentrated $Na_4[Fe^{II}(CN)_6]$ solution, in addition to a similar broadening effect as observed with the $^{17}$O $H_2O$ peak. Taken together, these effects demonstrate a much greater degree of association of the hexa-aqua $Na^+$ structure to the $Na_4[Fe^{II}(Dcbpy)_2(CN)_2]$ complex, relative to $Na_4[Fe^{II}(CN)_6]$ at similar concentration, which might be a significant contributing factor to the improved solubility of the former.

The electrochemical properties of new complex materials were evaluated by different voltammetry methods. Cyclic voltammetry results of $Na_4[Fe^{II}(Dcbpy)_2(CN)_2]$, $Na_4[Fe^{II}(Dcbpy)(CN)_4]$, $Na_4[Fe^{II}(Dcbpy)_3]$, and reference $K_4[Fe^{II}(CN)_6]$ were taken. Another redox peak at negative potential range belongs to 1,1'-bis(3-sulfonatopropyl)-4,4'-bipyridinium (SPr-Bpy), which was synthesized and used as an anolyte in this work. The redox potentials of $Na_4[Fe^{II}(CN)_6]$, $Na_4[Fe^{II}(Dcbpy)(CN)_4]$, $Na_4[Fe^{II}(Dcbpy)_2(CN)_2]$, and $Na_4[Fe^{II}(Dcbpy)_3]$ are 0.26 V, 0.41 V, 0.65 V, and 0.95 V (vs. Ag/AgCl), respectively. Redox potentials of the potassium salt are similar to those of the sodium salt as they share the same redox center. It is evident that the redox potential of the complexes can be efficiently tuned by replacing ligands. Quantum chemical calculations also confirm the effectiveness of tuning electrochemical potential with different ligands. The calculated redox potential and experimental redox potentials also correlated well with each other. When SPr-Bpy was used as the anolyte, the theoretical cell voltages with $Na_4[Fe^{II}(CN)_6]$, $Na_4[Fe^{II}(Dcbpy)(CN)_4]$, $Na_4[Fe^{II}(Dcbpy)_2(CN)_2]$, or $Na_4[Fe^{II}(Dcbpy)_3]$ were 0.8 V, 0.95 V, 1.2 V and 1.5 V, respectively.

A flow battery was assembled by using $Na_4[Fe^{II}(Dcbpy)_2(CN)_2]$ as the catholyte and SPr-Bpy as the anolyte. Initial tests were conducted with low-concentration (i.e., 0.1 M) active materials. The active materials in the cell were matched in a 1:1 electron ratio, and the pH of the solution was adjusted to 7. Ratability tests were conducted in a current density range from 30 mA/cm$^2$ to 100 mA/cm$^2$. During testing, the flow battery cell voltage was 1.2 V, which is near the limit of the water-splitting voltage of 1.23 V.

The utilization ratio of $Na_4[Fe^{II}(Dcbpy)_2(CN)_2]$ reached 82.5%, 81.7%, 75.4%, and 67.5% at 50 mA/cm$^2$, 60 mA/cm$^2$, 80 mA/cm$^2$, and 100 mA/cm$^2$, respectively. Based on the energy and voltage efficiency results, the long-term cycling test was conducted at 50 mA/cm$^2$. The cell was cycled galvonostatically for 5000 cycles. Representative charging and discharging profiles were plotted, and cycling data was compiled. The flow cell exhibited 83% materials utilization. Even after 5000 cycles, the discharge capacity retained 75% of its initial value, which is 99.994% of capacity retention per cycle. The energy and voltage efficiencies through the cycles remained around 79.1% with average coulombic efficiency of nearly 100%.

An aqueous organic redox flow battery (AORFB) with a high concentration of catholyte was fabricated. The catholyte concentration was 1.02 M $Na_4[Fe^{II}(Dcbpy)_2(CN)_2]$ (the limiting concentration of $Na_4[Fe^{II}(Dcbpy)_2(CN)_2]$ is 1.09 M), which represents a theoretical capacity of 27.3 Ah/L. The SPr-Bpy anolyte used in the cell was 1.2 M. The anolyte-to-catholyte ratio (i.e., electron ratio) was 1:1, and the energy density considering both the catholyte and anolyte capacity, as well as the cell voltage, reached 17.5 Wh/L. This system represents one of the highest energy densities reported for AORFBs. The cycling results showed that the cell reached 73% of the theoretical capacity under the current density of 24 mA/cm$^2$ and demonstrated a practical energy density of 12.5 Wh/L. The per-cycle capacity retention was 99.9% in the first 250 cycles. Cell degradation was attributed to the anolyte degradation under the test conditions.

A symmetry-breaking design strategy leads to dramatically enhanced solubility (up to 1.22 M) even with bulky organic ligands. The redox potential of the complexes of the present invention could be easily adjusted by combining two ligands, leading to a tunable redox potential for use as a catholyte. NMR analyses and DFT/AIMD studies revealed that the modulation of asymmetrically coordinated ligands affords a generic method for tailoring electrochemical properties and solvation status of metal complexes. An AORFB with $Na_4[Fe(Dcbpy)_2CN_2$ as the catholyte and SPr-Bpy as the anolyte demonstrated a high cell voltage of 1.2 V and outstanding stability in the first 5000 cycles with 99.994% capacity retention per cycle. A high concentration cell with a demonstrated energy density of 12.5 Wh/L (theoretical energy density 17.5 Wh/L) was tested at a 1:1 catholyte-to-anolyte electron ratio and exhibited 250 stable charge/discharge cycles with 99.9% capacity retention per cycle. The analysis revealed that the cyclability of the cell is limited by crossover and degradation of the anolyte used. The present invention therefore demonstrates a high-performance AORFB catholyte and a general strategy for designing metal complex materials for future high-energy-density AORFBs.

In light of the foregoing, it should be appreciated that the present invention significantly advances the art by providing am asymmetric metal complex as an active material of a flow battery that is structurally and functionally improved in a number of ways. While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

Examples

Chemicals

Iron(II) chloride, potassium dichromate was purchased through VWR (Beantown Chemical). 4,4'-Dipyridine was obtained from VWR (Matrix Scientific). 4,4'-Dimethyl-2,2'-bipyridine and 1,3-propane sultone was purchased from VWR (CHEM-IMPEX). DMSO-$d_6$ and $D_2O$ were obtained from Cambridge Isotopes. Other chemicals and solvents were purchased from Sigma, Fisher Scientific or VWR.

Synthesis of 1,1'-bis(3-Sulfonatopropyl)-4,4'-Bipyridinium 1,1'-bis(3-Sulfonatopropyl)-4,4'-Bipyridinium (SPr-Bpy) was synthesized as follows. 1,3-Propanesultone (36.8 g, 0.3 mol) was charged to a 500 mL flask with purged nitrogen. 200 mL toluene was then added, and the solution was heated to reflux. Subsequently, 4,4'-Bipyridine (18.8 g, 0.12 mol) in 150 mL toluene was added dropwise. After refluxing for 3 hours, the solution was cooled down to room temperature. The obtained precipitates were then filtered and washed with toluene, acetonitrile, and acetone subsequently. After drying in vacuum at 60° C. for 2 days, a white powder was obtained. 47 g, 97%. $^1$H NMR ($D_2O$, 500 MHz): δ (ppm), 2.58 (m, 4H), 3.08 (t, 4H), 4.94 (t, 4H), 8.61 (d, 4H), 9.20 (d, 4H). $^{13}$C NMR ($D_2O$): δ (ppm), 26.18, 47.08, 60.23, 127.20, 145.72, 150.34.

Synthesis of 2,2'-Bipyridine-4,4'-dicarboxylic acid 2,2'-Bipyridine-4,4'-dicarboxylic acid ($H_2Dcbpy$) was synthesized as follows. In a 1 L three neck flask, 4,4'-Dimethyl-2,2'-bipyridine (36.8 g, 0.2 mol) was dissolved in 250 mL sulfuric acid (98%) under stirring. The flask was then placed in an ice bath and potassium dichromate (129 g, 0.44 mol) was added slowly in one hour. After addition, the ice bath was replaced with an oil bath and solution was heated to 50° C. under stirring. The temperature was maintained for 16 h to finish the reaction. After cooled down to room temperature, the solution was poured into 3 L cold deionized (DI) water. The afforded precipitates were filtered and subsequently dissolved in 2 L potassium hydroxide solution (1 M). The solution was then acidified by adding 1 L of 2.5 M hydrochloric acid, resulting in white precipitates. The precipitates were filtered, washed with cold DI water and acetone. The white solid was dried in vacuum at 60° C. for 3 days. (46.5 g, yield 95%). $^1$H NMR (DMSO-d6, 500 MHz): δ (ppm), 7.91 (dd, 2H), 8.85 (d, 2H), 8.91 (dd, 2H), 13.78 (s, 2H). $^{13}$C NMR ($D_2O$): δ (ppm), 121.17, 123.26, 146.31, 149.65, 155.64, 172.89.

Preparation of $Na_4[Fe^{II}(Dcbpy)_3]$ $H_2Dcbpy$ (2.93 g, 0.012 mol) and 50 mL DI water was charged to a 250 mL flask and 2 M NaOH solution was added dropwise until $H_2Dcbpy$ was dissolved completely (about 120 ml). $FeCl_2$ (0.52 g, 0.004 mol) in 20 mL DI water was added dropwise and the pH value of the solution was monitored by a pH meter. During the addition of $FeCl_2$ solution, the pH value of the solution was maintained above 5 through adding drops of 0.05 M NaOH solution occasionally. After stirring for 30 min, 0.1 M HCl solution was added dropwise until the pH value reached 2. The resulting red precipitates were filtered, washed with 0.01M HCl and acetone. After being dried in a vacuum at 60° C. for 2 days, the precipitates (3.11 g) were mixed with NaOH (1.06 g, 0.026 mol) in 40 mL DI water. 150 mL Ethanol was added slowly to the mixture to precipitate the final product $Na_4[Fe^{II}(Dcbpy)_3]$. The afforded precipitates were filtered, washed with ethanol, and dried. 3.3 g, 94%. $^1$H NMR ($D_2O$, 500 MHz): δ (ppm), 7.58 (d, 6H), 7.69 (d, 6H), 8.91 (s, 6H). $^{13}$C NMR ($D_2O$): δ (ppm), 122.60, 125.74, 146.50, 154.37, 159.46, 170.97.

Preparation of $K_4[Fe^{II}(Dcbpy)_3]$

The preparation of $K_4[Fe^{II}(Dcbpy)_3]$ was done in a similar manner as described above for $Na_4[Fe^{II}(Dcbpy)_3]$ except for the use of a KOH solution as opposed to a NaOH solution. $K_4[Fe^{II}(Dcbpy)_3]$ produced a dark purple solid precipitate with a yield of 85%. $^1$H NMR ($D_2O$, 500 MHz): δ (ppm), 7.62 (d, 6H), 7.73 (d, 6H), 8.95 (s, 6H). $^{13}$C NMR ($D_2O$): δ (ppm), 122.64, 125.77, 146.54, 154.40, 159.49, 170.98.

Preparation of $Na_4[Fe^{II}(Dcbpy)_2(CN)_2]$

The procedure discussed below was conducted in a well-ventilated fume hood for safety. $H_2Dcbpy$ (6.1 g, 0.025 mol) and 70 mL deionized water was charged to a 250 mL flask and 1 M NaOH solution was added dropwise until $H_2Dcbpy$ was dissolved completely (about 55 ml). $FeSO_4 \cdot 7H_2O$ (2.43 g, 0.087 mol) in 25 mL deionized water was added dropwise, and the pH value of the solution was monitored by a pH meter. During the addition of $FeCl_2$ solution, the pH value of the solution was maintained above 5 by adding drops of 0.05 M NaOH solution occasionally. Then, a solid powder of 3.75 g sodium cyanide (NaCN, 0.076 mol) was added slowly, and the solution was stirred for 30 min at about 80° C. Subsequently, the pH of the solution was reduced to 4.5 by adding 3 M acetic acid, at which value the ligand ($H_2Dcbpy$)

precipitated. The precipitates were filtered out, and the pH value of the filtration was adjusted to less than 2 by addition of 1 M $H_2SO_4$. Dark green precipitates were collected by filtration and washed with 0.05 M $H_2SO_4$ and acetone. The collected acid formed product [$Fe^{II}(H_2Dcbpy)_2(CN)_2$] was subsequently dissolved in 1 M NaOH and precipitated in ethanol, yielding a dark purple solid. (3.43 g, yield: 66%). $^1$H NMR ($D_2O$, 500 MHz): δ (ppm), 7.45 (d, 2H), 7.58 (d, 2H), 7.98 (d, 2H), 8.73 (s, 2H), 8.78 (s, 2H), 9.57 (d, 2H). $^{13}$C NMR ($D_2O$): δ (ppm), 121.49, 124.97, 144.96, 151.06, 157.52, 158.93, 171.60.

Preparation of $K_4[Fe^{II}(Dcbpy)_2(CN)_2]$

The preparation of these complexes followed the similar procedures as described for $Na_4[Fe^{II}(Dcbpy)_2(CN)_2]$. The same procedure was used until the acid form $Fe^{II}(H_2Dcbpy)_2(CN)_2]Cl_2$ was obtained and then the corresponding base potassium hydroxide was used to precipitate the final products $K_4[Fe^{II}(Dcbpy)_2(CN)_2]$. $K_4[Fe^{II}(Dcbpy)_2(CN)_2]$ produced a dark purple solid with a yield of 85%. $^1$H NMR ($D_2O$, 500 MHz): δ (ppm), 7.44 (d, 2H), 7.56 (d, 2H), 7.96 (d, 2H), 8.71 (s, 2H), 8.76 (s, 2H), 9.55 (d, 2H). $^{13}$C NMR ($D_2O$): δ (ppm), 121.29, 124.98, 145.21, 151.05, 157.53, 158.93, 171.57.

Preparation of $Na_4[Fe^{II}(Dcbpy)(CN)_4]$

The procedure discussed below was conducted in a well-ventilated fume hood for safety. $H_2Dcbpy$ (0.49 g, 2 mmol) and 50 mL DI water was charged to a 250 mL flask and 2 M NaOH solution was added dropwise until $H_2Dcbpy$ was dissolved completely (about 8 ml). $FeSO_4 \cdot 7H_2O$ (2.2 g, 8 mmol) was dissolved in 50 mL of about 0.1 M sodium acetate/acetic acid buffer solution (at pH of between about 4.5 and 5). Afterwards, the Dcbpy solution was added dropwise to the stirring $FeSO_4$ solution. The resulting red precipitates were filtered, washed with water, and then added to 20 mL of NaCN (1.18 g, 24 mmol) aqueous solution. The resulting mixture was stirred for 10 min and filtered. The filtrate was then precipitated in 200 mL ethanol. The collected precipitate was dried in vacuum at 60° C. for 2 days. (0.49 g, yield: 47%). $^1$H NMR ($D_2O$, 500 MHz): δ (ppm), 7.82 (d, 2H), 8.60 (s, 1H), 9.46 (d, 2H). $^{13}$C NMR ($D_2O$): δ (ppm), 120.43, 123.94, 143.90, 154.30, 157.14, 172.35, 176.01, 176.40.

Preparation of $K_4[Fe^{II}(Dcbpy)(CN)_4]$

The procedure discussed below was conducted in a well-ventilated fume hood for safety. The potassium salts were obtained by cation exchange from the $Na_4[Fe^{II}(Dcbpy)(CN)_4]$. The ion-exchange resin (Amberlyst® 15 hydrogen) was charged to a column (about 100 mL volume) and flushed with 300 mL 0.1 M KOH/1 M KCl aqueous solution to convert the proton to potassium form in the resin. Then the column was washed with about 300 mL DI water. 1 g of $Na_4[Fe^{II}(Dcbpy)(CN)_4]$ dissolved in 10 mL water was added onto the column and washed out by DI water. The collected solution was concentrated to 10 mL by rotating evaporator and precipitated in 100 mL ethanol. (1.05 g, yield: 93%) NMR ($D_2O$, 500 MHz): δ (ppm), 7.83 (d, 2H), 8.62 (s, 1H), 9.47 (d, 2H). $^{13}$C NMR ($D_2O$): δ (ppm), 120.44, 123.94, 143.93, 154.30, 157.15, 172.33, 175.90, 176.24.

Flow Cell Testing

A flow cell was assembled with a pretreated Nafion 212 membrane (Chemours Nafion™ PFSA NR-212, used for all capacity balanced cells) or Fumasep® FKE-50 membrane (Fuel Cell store, used for all catholyte capacity limiting cells), home-made poly(tetrafluoroethylene) (PTFE) frame, carbon felt electrodes (size 5 cm$^2$, thickness of 3.2 mm, AvCarb Material Solutions Co.), Poco graphite plate with single serpentine channel (Fuel Cell Technologies Inc.) and cupper current collector. Prior to the cell assembly, the Nafion 212 membranes were soaked in 0.5 M NaCl or 0.5 M KCl aqueous solution overnight. The carbon felt electrodes were pretreated at 400° C. in air for 20 hours before use. A Cole-Parmer Masterflex L/S peristaltic pump was used to circulate active materials.

Low Concentration Flow Cells

To create a catholyte capacity limiting $Na_4[Fe^{II}(Dcbpy)_2(CN)_2]$ cell, 0.16 M SPr-Bpy in 1 M NaCl was used as an anolyte (6 mL). 0.1 M $Na_4[Fe^{II}(Dcbpy)_2(CN)_2]$ in 1 M NaCl was used as a catholyte (in 4.5 mL). The electrolytes were stored in two home-made glass vials with air-tight sealing. The flow cell was galvanostatically charged and discharged at assigned current densities at room temperature. The cell was assembled and tested in a nitrogen-filled glovebox. For the long cycle test, the flow rate was 40 mL/min. The cell was charged/discharged with CC/CV protocol, the current density in galvanostatic step was 40 mA/cm$^2$. After the limiting voltage was reached, the cell testing was switched to potentiostatic step until the current reached 2 mA/cm2. The cutoff voltage was 0.8-1.35 V or 0.8-1.4 V.

To create a capacity balanced $Na_4[Fe^{II}(Dcbpy)_2(CN)_2]$ cell, 0.1 M SPr-Bpy in 1 M NaCl was used as an anolyte (4.5 mL). 0.1 M $Na_4[Fe^{II}(Dcbpy)_2(CN)_2]$ in 1 M NaCl was used as a catholyte (in 4.5 mL). The electrolytes were stored in two home-made glass vials with air-tight sealing. The flow cell was galvanostatically charged and discharged at assigned current densities at room temperature. The cell was assembled and tested in a nitrogen-filled glovebox. For the long cycle test, the flow rate was 40 mL/min, and the current density was 50 mA/cm$^2$. Capacity balanced $K^4[Fe^{II}(Dcbpy)_2CN_2]$ cells were prepared in the exact same manner, except the salt has been changed to the corresponding chloride.

To create a capacity balanced $Na_4[Fe^{II}(Dcbpy)(CN)_4]$ cell, 0.1 M SPr-Bpy in 1 M NaCl was used as an anolyte (4.5 mL). 0.1 M $Na_4[Fe^{II}(Dcbpy)(CN)_4]$ in 1 M NaCl was used as a catholyte (4.5 mL). The electrolytes were stored in two home-made glass vials with air-tight sealing. The flow cell was galvanostatically charged and discharged at assigned current densities at room temperature. The cell was assembled and tested in a nitrogen-filled glovebox. For the long cycle test, the flow rate was 40 mL/min, and the current density was 40 mA/cm$^2$.

High Concentration Flow Cells

To create a capacity balanced $Na_4[Fe^{II}(Dcbpy)_2(CN)_2]$ cell, for the anolyte, 1.2 M SPr-Bpy in 1.2 M NaCl and 0.4 M sodium acetate was used (total volume: 3 mL). For the catholyte, $Na_4[Fe^{II}(Dcbpy)_2(CN)_2]$ with 0.1 M NaOH (total volume: 3.6 mL) was used. The catholyte was prepared by dissolving $Na_4[Fe^{II}(Dcbpy)_2(CN)_2]$ in 2.8 mL DI water (3.4 mL total volume) followed by 5 pre-cycles with the anolyte. Then 0.2 mL 1.8 M NaOH was added to the catholyte to form 1.02 M $Na_4[Fe^{II}(Dcbpy)_2(CN)_2]$ in 3.6 mL electrolyte. The flow cell was galvanostatically charged and discharged at current density of 24 mA/cm$^2$ at room temperature. The flow rate was 24 mL/min, and the cell was assembled and tested in a nitrogen-filled glovebox. For post-mortem analysis, the electrolyte after the full discharge of the cell cycling was collected, dried in vacuum, and dissolved in $D_2O$ for the $^1$H NMR test, which was then compared to the fresh electrolyte.

To create a capacity balanced $Na_4[Fe^{II}(Dcbpy)_2(CN)_2]$ cell, for the anolyte, 1 M SPr-Bpy in 1.6 M NaCl and 0.4 M sodium acetate was used (total volume: 10 mL). For the catholyte, 1 M $Na_4[Fe^{II}(Dcbpy)_2(CN)_2]$ (total volume: 4 mL) was used. The catholyte was prepared by dissolving $Na_4[Fe^{II}(Dcbpy)_2(CN)_2]$ in DI water followed by 20 pre-cycles with the anolyte. Then 0.2 mL 1 M NaOH was added to the catholyte to balance water crossover and sodium ion concentration. An additional two 0.1 mL 1 M NaOH was added into about the following 25 cycle to maintain the sodium ion concentration. The flow cell was galvanostatically charged (40 $mA/cm^2$) until the cutoff voltage was reached (1.35 V), and then potentiostatically charged until the cutoff current was reached (2 $mA/cm^2$). For the discharge process, the cell was galvanostatically discharged (40 $mA/cm^2$) until the cutoff voltage was reached (0.4 V) and potentiostatically discharged until the cut-off current was reached (2 $mA/cm^2$). The flow rate was 40 mL/min, and the cell was assembled and tested in a nitrogen-filled glovebox at room temperature.

What is claimed is:

1. An asymmetrical metal complex comprising a metal center coordinated with between two and six hydrophilic ligands, wherein at least one of said hydrophilic ligands is chemically different than the other said hydrophilic ligands, and a cation selected from sodium, potassium, lithium, magnesium, calcium, pyridinium, imidazolium, and ammonium, wherein the metal center is selected from iron, cobalt, titanium, vanadium, chromium, manganese, nickel, copper, aluminum, and zinc, and wherein a first ligand of the between two and six hydrophilic ligands is 2,2'-bipyridine-4,4'-dicarboxylic acid (Dcbpy), and where a second ligand of the between two and six hydrophilic ligands is cyanide.

2. The asymmetrical metal complex of claim 1, further comprising an anion selected from sulfate, carbonate, nitrate, perchlorate, chlorine, bromine, iodine, sulfur, oxalate, cyanide, bicarbonate, hydrogen sulfate, acetyl, and hydroxide.

3. The asymmetrical metal complex of claim 1, wherein solubility of the asymmetrical metal complex in water is larger than 0.5 M at a temperature of greater than 20° C.

4. The asymmetrical metal complex of claim 1, wherein the cation is selected from sodium and potassium.

5. The asymmetrical metal complex of claim 1, wherein the metal center is iron.

6. The asymmetrical metal complex of claim 1, wherein the metal center is selected from iron, manganese, zinc, and nickel.

* * * * *